UNITED STATES PATENT OFFICE.

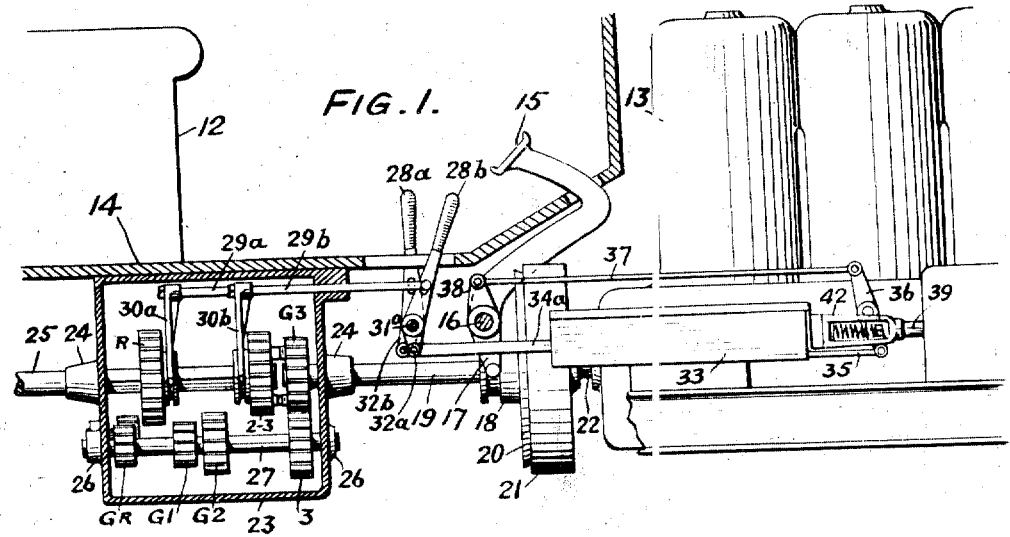

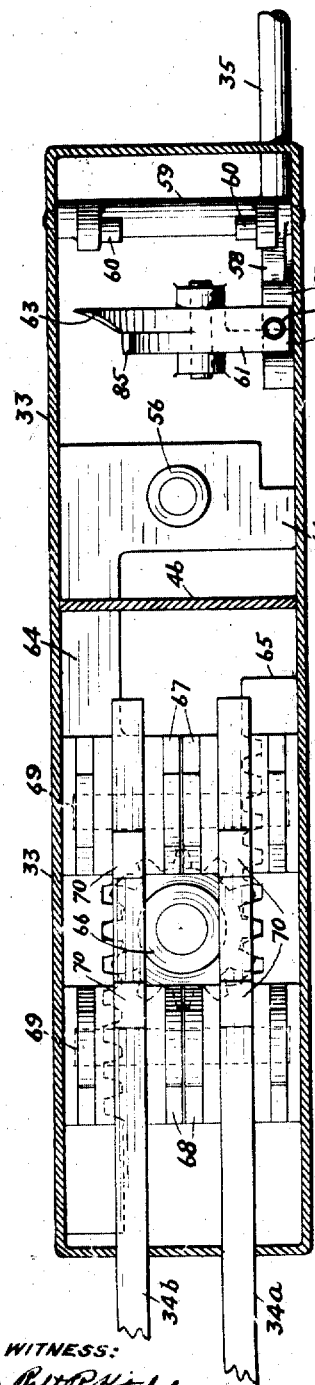
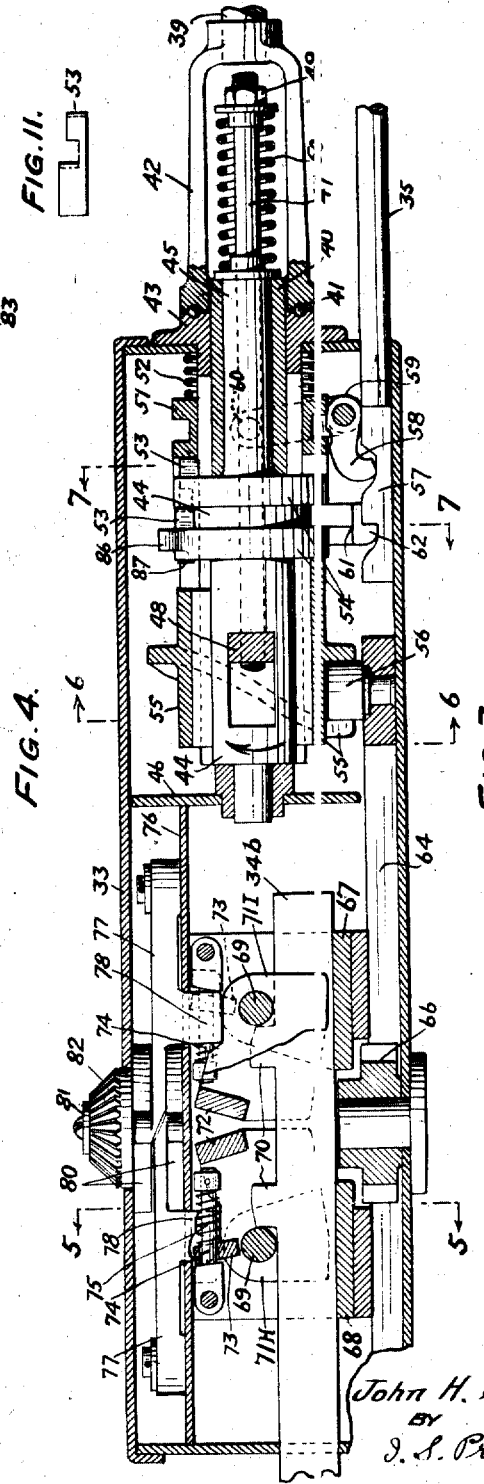

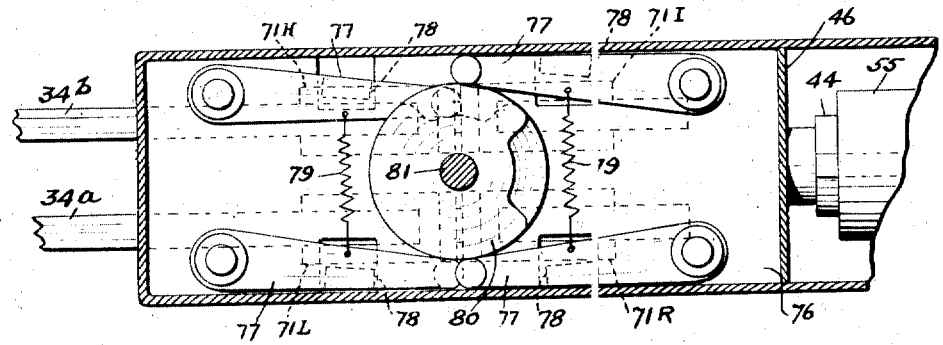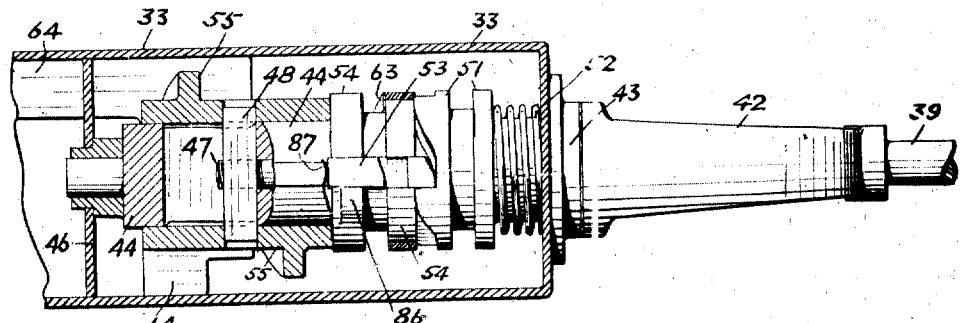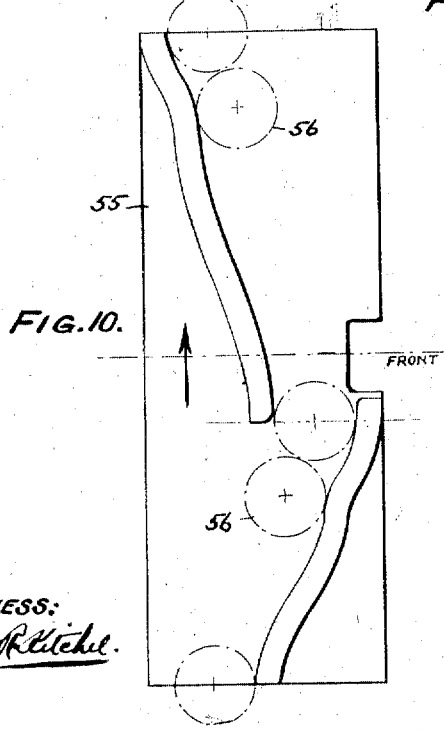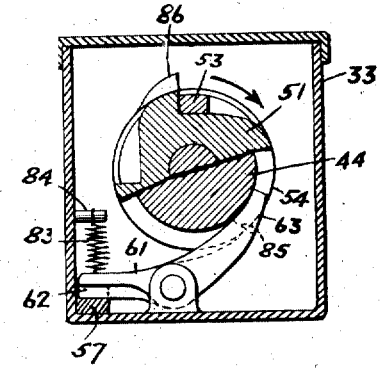

JOHN H. STORTZ, OF PHILADELPHIA, PENNSYLVANIA, ASSIGNOR TO STORTZ GEAR SHIFT COMPANY, OF WILMINGTON, DELAWARE.

POWER-TRANSMITTING MECHANISM.

1,224,682.

Specification of Letters Patent.

Patented May 1, 1917.

Application filed October 12, 1915. Serial No. 55,461.

*To all whom it may concern:*

Be it known that I, JOHN H. STORTZ, a citizen of the United States, and a resident of Philadelphia, in the county of Philadelphia and State of Pennsylvania, have invented certain new and useful Improvements in Power-Transmitting Mechanism, of which the following is a specification.

This invention relates to a power transmitting device, and is particularly adapted to connect a driving element with a speed changing driven element, and is in the nature of an improvement upon my gear shifting apparatus covered by an application for Letters Patent of the United States, filed July 21, 1914, Serial No. 852,320.

One of the objects of my present invention is to provide improved means whereby the hand operated levers of an automobile may be connected with its driving element, when the foot pedal of the automobile is operated to disconnect it from its driving element.

Another object is to provide the gear shifting mechanism of an automobile with means adapted to positively indicate whether a gear was properly shifted, said indicating means being in the form of hand levers adapted to shift the gears in an ordinary manner in case of an emergency.

A further object is to provide improved means whereby the clutch controlling lever becomes adapted to connect positively the driving element of a machine with a speed changing element when said controlling lever is operated to disconnect the machine from the driving element.

A further object is to provide improved means whereby the interchangeable gears of a machine provided with a clutch for disconnecting it from its driving element are shifted before the clutch is released to connect the machine with its driving element.

A further object is to provide improved means adapted to prevent the shifting of the gears of a machine when it is connected with its driving element.

A further object is to provide improved means adapted to prevent the shifting of any one of a set of gears except after the entire set has been neutralized.

A further object is to provide means whereby a shaft, rotated by the driving element of a machine, is caused to change the speed of the machine during one revolution following the disconnection of the driving element from the machine.

A further object is to provide means whereby a shaft operated by the driving element of an automobile is connected with its gear shifting mechanism whenever its foot pedal is operated to disconnect it from the driving element, and to cause said shaft to actuate said mechanism first to shift the gears into a neutral position and last to shift one of the gears into a preselected speed changing position.

A further object is to provide a power transmitting mechanism adapted to connect a driven element of a machine with its driving element with an element adapted to yield to the driven element when said element fails to respond to the driving element.

With the above and related objects in view, this invention comprises the means hereinafter described, a practical application whereof is illustrated in the accompanying drawings, and embraced within the scope of the appended claims.

In the said drawings:—Figure 1 is a diagrammatic view of a portion of an automobile provided with my improved mechanism; Fig. 2 is a similar plan view thereof; Fig. 3 is a section on the line 3—3 of Fig. 5; Fig. 4 is a plan view of my gear shifting mechanism shown to be mounted in the lower portion of a casing which is shown in section; Fig. 5 is a section on the line 5—5 of Fig. 3; Fig. 6 is a section on the line 6—6 of Fig. 3; Fig. 7 is a section on the line 7—7 of Fig. 3; Fig. 8 is a plan view of the speed selecting portion of my mechanism shown to be mounted in the casing on top of the gear shifting mechanism; Fig. 9 is a plan view, partly in section, of the transmitting mechanism shown to be mounted in the casing on top of the parts of my mechanism shown on the right of Fig. 4; Fig. 10 is the development of a cam collar in connection with my transmitting mechanism, and Fig. 11 is a notched bolt in connection therewith.

Referring more particularly to the drawings for a detail description of my invention:—12 represents an automobile, 13 its driving element and 14 its foot board. 15 represents the foot pedal of a lever fulcrumed on a rock shaft 16, 17 represents a forked lever fulcrumed on said shaft and operatively connected with a sleeve 18 mounted to slide on and to rotate with the driving shaft 19. 20 represents a clutch member adapted to move with the sleeve 18, 21 represents a fly wheel adapted to be clutched by the member 20, and 22 represents a shaft of the driving element carrying the fly wheel. 23 represents a gear box provided with bearings 24, one in front of the box supporting the shaft 19 and the other in its rear supporting a driven shaft 25. 26 represents a pair of bearings of the box 23 which supports a counter shaft 27. On the shaft 19, inside the box 23, is fixedly mounted a gear $G^3$, and on the square faced portion of the shaft 25 inside said box are slidingly mounted the gears R and 2—3. On the shaft 27 are fixedly mounted gears GR in mesh with an idler, $G^1$, $G^2$ and 3 in mesh with the gear $G^3$, $28^a$ and $28^b$ are hand levers, $29^a$ and $29^b$ represent rods pivotally connected with said levers, and $30^a$ and $30^b$ represent shifter arms carried by said rods. The arm $30^a$ is connected with the gear R to shift it from a neutral position rearwardly to mesh with the idler of the gear GR and frontwardly to mesh with the gear $G^1$, and the arm $30^b$ is connected with the gear 2—3 to shift it from a neutral position rearwardly to mesh with the gear $G^2$ and frontwardly to couple with the gear $G^3$. $31^a$ represents a rod on which the lever $28^a$ is fulcrumed, and $31^b$ represents a sleeve mounted on said rod on which the lever $28^b$ is fulcrumed. $32^a$ represents the arm of a lever fulcrumed on the rod $31^a$, and $32^b$ represents the arm of a lever fulcrumed on the sleeve $31^b$.

33 represents a casing slidingly supporting a shifter bar $34^a$ which is projected rearwardly of said casing and connected with the arm $32^a$, and $34^b$ represents a similarly supported bar connected with the arm $32^b$. 35 represents a rod slidingly supported by the casing and projected frontwardly thereof, 36 represents a lever having an arm pivotally connected with the projecting end of the rod 35 and an arm pivotally connected by a rod 37 with the arm of a lever 38 fulcrumed on the rock shaft 16.

39 represents a shaft rotated by the driving element, 42 represents a bifurcated coupling carried by said shaft, and 40 represents a sleeve mounted inside the casings and connected with the shaft 39 by the coupling 42. The casing 33 is provided with an ordinary bearing 41 for the sleeve and with a ball-bearing 43 for the coupling. 44 represents a transmitter shaft provided with a bored journal 45 surrounded by the sleeve 40, and with a journal supported by a bearing of the partition 46. 47 represents a rod surrounded by the shaft 44. 48 represents an oblong nut mounted upon the rear end of said rod and projected through the shaft at right angles to a longitudinal slot thereof, 49 represents a nut mounted upon the front end of the rod, and 50 represents a spring wound about the rod between the nut 49 and the rim of the journal 45.

51 represents a grooved collar, provided with a serrated face in front of the face of one of a pair of flanges 54 of the shaft 44, said collar 51 being mounted to slide on the sleeve 40. 52 represents a spring coil adapted to force the collar 51 in the direction of the shaft 44. 53 represents a bolt carried by the shaft 44 in position to become engaged with the serrated face of the collar 51. 55 represents a collar slidingly keyed on the shaft 44, said collar having a peripheral diagonally directed endless cam forming a roller bearing surface for a roller 56.

57 represents a block provided with a serrated top carried by the rod 35 inside the casing 33. 58 represents the hooked arm of a lever provided with a yoke 59 fulcrumed transversely across the casing and provided with brackets which span the collar 51, said brackets carrying pins 60 which are projected within the groove of said collar. 61 represents a lever provided with a hooked arm 62, and with an arm provided with a wedge 63.

64 represents a rack provided with a bearing for the roller 56, 65 represents a detached rack, and 66 represents a pinion meshing with both racks and adapted to transmit the motion of the rack 64 to the rack 65 to cause it to move in opposition to the rack 64. 67 represents a pair of brackets carried in transverse alinement by the rack 64, and 68 represents a pair of similar brackets carried by the rack 65 in opposition to that of the rack 64. Each pair of said brackets is joined transversely by a rod 69. The brackets are adapted to slidingly support the bars $34^a$ and $34^b$, with the rods 69 crossing both bars, and each bar is provided longitudinally with a pair of lugs 70 between the rods.

Upon the end of the rod of the brackets 67 which crosses the bar $34^a$ is fulcrumed a floating lever $71^R$, and upon the opposite end of the same rod where it crosses the bar $34^b$ is fulcrumed a similar lever $71^L$; upon the end of the rod of the brackets 68 which crosses the bar $34^a$ is fulcrumed a similar lever $71^L$, and upon the opposite end of this rod where it crosses the bar $34^b$ is fulcrumed a similar lever $71^H$. Each of said floating levers is provided with a hook 72 adapted to become engaged with the inner side of an adjacent lug of a bar, and with a bracket 73 above its fulcrum, said brackets being perforated to slide along the legs of bolts 74. Each bolt has its leg pivoted upon a corresponding rack bracket, and has a coil spring 75 wound about the leg between its head and the lever bracket.

76 represents a partition horizontally supported above the floating levers, said partition being provided with upwardly projected pins in transversely and longitudinally alined pairs. 77 represents levers having their corresponding ends fulcrumed upon the pins of the partition 76, with the free ends of each pair overlapping and beveled to clear each other, each pair of the transversely alined levers being connected by a spring 79. Each lever is provided with a lug 78 which is projected through a corresponding perforation of the partition 76 in alinement with a corresponding floating lever and adapted to ride on top of said floating levers.

80 represents an interlocking speed selector, comprising a pair of disks mounted in alinement upon a shaft 81, the periphery of each disk being provided with a recess peripherally displaced from a similar recess of the other disk, in such a manner that when the shaft 81 is turned by its gear 82, the free ends of the levers 77 are supported by the peripheries of the disks to force their lugs off the floating levers, until one of the recesses is brought into position to permit one of the springs 79 to force the free end of a lever within said recess and causing its lug to ride on top of a corresponding floating lever.

83 represents a spring suspended from a pin 84 mounted inside the casing 33 and connected with the hooked arm of the lever 61, 85 represents the butted end of the wedge arm of the lever, and 86 represents a lug of the shaft 44 adapted to butt against the end 85 of the lever 61. 87 represents a flat spring carried by the shaft 44 and adapted to force the bolt 53 frontwardly to become engaged with a recess of the serrated face of the collar 51.

From the above description it will be readily understood that by depressing the pedal 15 from its position shown in Fig. 1, the shaft 16 is rocked with the arms of the levers 17 and 38 in a direction to move the clutch member 20 out of engagement with the fly wheel whereby the machine is disconnected from its driving element 13 and to swing the lever 36 in a direction to force the rod 35 inwardly of the casing 33. Assuming that the result of this inward movement of the rod 35 is to bring the block 57 in the position shown in Fig. 3, then the lever 58 is free and the collar 51 is forced by the spring 52 in the direction of the shaft 44 to become connected therewith by the bolt 53 which is forced by the spring 87 to enter a recess of the serrated face of the said collar 51. The lever 61 is also free to swing with its wedge arm in position shown in Fig. 7, as its hooked arm is free to be forced by the spring 83 to enter the recess of the serrated face of the block. Assuming that Fig. 3 illustrates the relative positions of the elements after the shaft 44 has entered upon the second half of its revolution, it will be understood, by referring to Fig. 10, that the rack 64 which is connected with the cam collar 55 of the shaft 44 by means of the roller 56, has moved frontwardly and the rack 65 rearwardly. The above described movement of the racks brings the two pairs of brackets 67 and 68 into the position shown in Fig. 4 with their rods 69 bearing against the exterior sides of the lugs 70 of the bars 34$^a$ and 34$^b$. It will thus be understood that, during the first half of a revolution of the shaft 44 with its collar 55, the bars 34$^a$ and 34$^b$ are caused to assume a position wherein their lugs 70 are in alinement, and correspond with the neutral position of the gears R and 2—3. During the second half of the revolution of the shaft 44, the rack 64 will be moved by the cam of the collar 55 rearwardly, and cause the rack 65 to move frontwardly, resulting in the pairs of brackets 67 and 68 being carried away from each other. It will be observed, by referring to Fig. 5, that a lug 78 of a non-floating lever 77 is on top of the floating lever 71$^H$, and as the floating levers are now being carried in pairs frontwardly and rearwardly, the lever 71$^H$ is moved under the said lug 78 and is therefore forced down with its hook 72 into the recess of the bar 34$^b$ to become engaged with the rearmost lug of said bar, whereby said bar is forced to move into a rearward position. The rearward movement of the bar 34$^b$ is transmitted by the lever 32$^b$ to the sleeve 31$^b$ and thence to the lever 28$^b$, which is thereby made to assume the position shown in Fig. 1, and the shifter 30$^b$, which is connected with said lever by the rod 29$^b$ is caused to shift the gear 2—3 from its neutral position to become connected with the gear G$^3$ adapted to drive the machine at the speed of the driving element 3, to wit, at its high or third speed.

By referring to Fig. 7 it will be understood that, during a revolution of the shaft 44, the bolt 53 is carried toward the wedge 63 of the lever 61 which is thereby forced into the notch of said bolt, whereby said bolt is forced rearwardly out of the recess of the serrated face of the collar 51, and the shaft 44 becomes disconnected from the shaft 39, that is, it becomes incapable of transmitting power to the gear shifting mechanism after the completion of one revolution, and furthermore, it is held fast by the butt end 85 of the lever 61 being in contact with the lug 86 of said shaft 44. The advantage to be derived from the above arrangement will be obvious in case a shiftable gear butts up against another gear and cannot be moved into its proper position, as the stoppage of the shaft 44 will prevent the shiftable gear from hammering the other gear. It will be observed that the position of each of the shiftable gears is indicated by the levers 28ª and 28ᵇ, that is, when said gears are in a neutral position, said levers are in a vertical position, and when a shiftable gear fails to move from said position a corresponding lever will fail to swing from said vertical position, and the operator, noticing said condition, will be able to manipulate the foot pedal to urge the recalcitrant gear into a proper position. It will be understood that, in addition to the function of the levers 28ª and 28ᵇ to indicate the positions of the gears, they may be used as ordinary manually operated gear shifting levers independently of the power transmitting mechanism.

It will be observed, by referring to Fig. 8, that when the floating lever 71ᴴ is to be constrained by the lug 78 of a lever 77, the free end of said lever is in a recess of the selector 80, and that said selector may be revolved to force said free end upon its periphery similarly with the free ends of the other levers, with their lugs alongside the floating levers. If the foot pedal be now depressed, then during the first half of the revolution of the shaft 44, which results in the pairs of brackets 67 and 68 approaching one another, the bar 34ᵇ is moved from its rearmost position frontwardly by the rod of the brackets 68, which movement is transmitted to the lever 28ᵇ to swing it into a vertical position in alinement with the lever 28ª to cause the arm 30ᵇ to shift the gear 2—3 rearwardly from the gear G³ into a neutral position during the first half of the revolution of said shaft, while during the last half of the revolution there will be no displacement of the gears, in view of the fact that the floating levers are free to move relatively to the bars 34ª and 34ᵇ when the hooks 72 are held by the springs 75 above the lug 70 whereby they are prevented from engaging the bars 34ª and 34ᵇ with their hooks 72 to cause the shiftable gears to move away from their neutral positions. On the other hand, should the selector be turned until the free end of a non-floating lever whose lug was in alinement with the floating lever 71ᴵ is within a recess of said selector, said lug will be forced on top of said floating lever, and during the last half of the revolution of the shaft 44 said floating lever will be forced with its hook into the recess between the lugs of the bar 34ᵇ and become engaged with the inner side of the frontward lug of said bar and force said bar into its foremost position, which movement will cause the lever 28ᵇ to swing past its vertical position from its position of Fig. 1 and cause the arm 30ᵇ to shift the gear 2—3 through its neutral position and into mesh with the gear G² which corresponds with the second or intermediate speed. If the foot pedal be moved to assume the position shown in Fig. 1, the clutch member 21 is actuated to establish an operative connection between the machine and its driving element, and the rod 35, which is shown to be operatively connected with the foot pedal, forces the block 57 rearwardly, whereby the hooks 58 and 62 are forced out of the notches of the block and on top of said block. With their hooks thus supported, the wedge of the lever 61 is forced out of the notch of the block 53 and the shaft 44 is released by the butt end 85 being removed from the lug 86, but although the spring 87 forces the bolt 53 in the direction of the collar 51, the yoke 59 of the lever 58 forces said collar with its serrated face away from the shaft 44 and into a position wherein the bolt remains outside of its serrated face, wherefore the transmitting mechanism becomes disconnected from the driving element.

To change to the first or low speed, the selector may be turned until the free end of a non-floating lever whose lug is in alinement with the floating lever 71ᴸ enters a recess of the selector, and by depressing the foot pedal, which has the effect to release the collar 51 to be forced by its spring 52 into a position wherein the shaft 44 becomes connected with the driving element, the rod 69 of the pair of brackets 67 forces the bar 34ᵇ rearwardly, which causes the lever 28ᵇ to swing frontwardly into a vertical position and the gear 2—3 is forced out of mesh with the gear G² and moved into its neutral position; the rearward lug of the bar 34ª becomes then engaged with the hook of the lever 71ᴸ and is forced rearwardly, whereby the lever 28ª is swung frontwardly causing the arm 30ª to move the gear R from its neutral position into mesh with the gear G¹.

To reverse the speed, the selector is turned until the free end of the non-floating lever whose lug is alongside the floating lever 71ᴿ enters a recess of the selector, and by depressing the foot pedal, the rod 69 of the pair of brackets 68 forces the bar 34ª frontwardly, whereby the lever 28ª is caused to swing from its frontward inclination into a vertical position and the arm 30ª forces the gear R out of mesh with the gear GR and into its neutral position, whereupon the said bar 34ª is forced by the hook of the floating lever 71ᴿ frontwardly, causing the lever 28ª to swing from its vertical position rearwardly and the arm 30ª forces the gear R from its neutral position into mesh with the idler of the gear GR.

It will be understood that, if either one of the shiftable gears should fail to move into a proper speed changing position, the rack 64 will fail to respond to the cam collar 55. The said collar will then yield to the rack and slide rearwardly on the shaft 44, compressing the spring 50. This failure of the gear to move will be immediately indicated by the corresponding gear shifting hand lever. The operator could then manipulate the foot pedal to urge the gears into a proper position. When the gears are in position to become properly engaged, the rack 64 will be free to respond to the cam collar, and the expansion of the spring 50 is sufficient to force the said collar and to support it in position to move the rack.

Having thus described my invention, what I claim as new and desire to protect by Letters Patent, is—

1. A power transmitting mechanism comprising, in combination, with the driving and driven elements of a machine, a transmitting mechanism comprising a member operatively connected with the driven element to reciprocate it and a member adapted to rotate it, and means adapted to selectively connect said members with the driving element.

2. In a power transmitting mechanism, a driving element, a driven element, a transmitting mechanism comprising a reciprocating member connected with the driven element and normally disconnected from the driving element and a rotating member normally adapted to connect the driving and driven elements, and means adapted to disconnect the driving element from the rotating member and contemporaneously therewith to connect the driving element with the reciprocating member.

3. A power transmitting mechanism comprising, in combination with the driving and driven elements of a machine, a transmitting mechanism comprising a reciprocating member connected with the driven element and a rotating member adapted to connect the driving with the driven element, and means adapted to prevent the connection between the rotating member and the driving element and to establish a connection between the reciprocating member and the driving element.

4. A power transmitting mechanism comprising, in combination with the driving and driven elements of a machine, a transmitting element operatively connected with the driven element and adapted to reciprocate said driven element, means adapted to cause the driven element to be rotated by the driving element, means to prevent said rotation, and yieldable means adapted to be actuated by the preventing means to connect the transmitting and driving elements.

5. A power transmitting mechanism comprising, in combination with the driving and driven elements of a machine, means for connecting said elements, a transmitting element operatively connected with the driven element, a connecting bolt carried by the transmitting element, a connecting collar mounted on the driving element, and means adapted to disconnect the driving and driven elements and contemporaneously therewith to establish an operative connection between the bolt and the collar.

6. A power transmitting mechanism comprising, in combination with the driving and driven elements of a machine, a transmitting element operatively connected with the driven element and adapted to reciprocate said driven element, means for causing the driven element to be rotated by the driving element, means for preventing said rotation, and means carried by the transmitting and driving elements adapted to be actuated by the preventing means to establish an operative connection between said elements.

7. A power transmitting mechanism comprising, in combination with the driving and driven elements of a machine, a transmitting element operatively connected to reciprocate the driven element, a bolt carried by the transmitting element, and a collar provided with a serrated face adapted for engagement with the bolt carried by the driving element.

8. A power transmitting mechanism comprising, in combination with the driving and driven elements of a machine, a transmitting element operatively connected with the driven element and adapted to reciprocate said driven element, means adapted to cause the driven element to be rotated by the driving element, means for preventing said rotation, and means slidingly mounted on the driving element adapted to be actuated by the preventing means to connect it with the transmitting element.

9. A power transmitting mechanism comprising, in combination with the driving and driven elements of a machine, a transmitting element operatively connected with the driven element and adapted to reciprocate said driven element, means adapted to cause the driven element to be rotated by the driving element, means for preventing said rotation, and yieldable means carried by the driving element adapted to be actuated by the preventing means to connect it with the transmitting element.

10. A power transmitting mechanism comprising, in combination with the driving and driven elements of a machine, a transmitting element operatively connected with the driven element and adapted to reciprocate said driven element, means to cause the driven element to be rotated by the driving element, means for preventing said rotation, a collar provided with a recessed face carried by the driving element, and a yieldingly supported bolt carried by the transmitting element adapted to be actuated by the preventing means to register with a recess of the collar.

11. A power transmitting mechanism comprising, in combination with the driving and driven elements of a machine, a transmitting element operatively connected with the driven element adapted to reciprocate the said driven element, means adapted to cause the driven element to be rotated by the driving element, means to prevent said rotation, a bolt adapted to be projected in the direction of the driving element carried by the transmitting element, and a collar provided with a recess for the bolt adapted to be forced by the preventing means in the direction of the transmitting element carried by the driving element.

12. A power transmitting mechanism comprising, in combination with the driving and rotating driven elements of a machine, means for preventing said rotation, a transmitting element operatively connected to reciprocate the driven element and a connecting means carried thereby, a sleeve carried by the driving element and a connecting means carried by the sleeve, and yieldable means adapted to be constrained by the preventing means to actuate the connecting means to interconnect the transmitting element and the sleeve.

13. A power transmitting mechanism comprising, in combination with the driving and rotating driven elements of a machine, means for preventing said rotation, a transmitting element operatively connected to reciprocate the driven element and adapted to be connected with the driving element, and a sleeve provided with a bearing for the transmitting element and adapted to be actuated by the preventing means to connect said element with the driving element.

14. A power transmitting mechanism comprising, in combination with the driving and driven elements of a machine, a transmitting element, means adapted to selectively connect the driving element with the driven and transmitting elements, and means operatively connecting the transmitting element with the driven element.

15. A power transmitting machine comprising, in combination with the driving and driven elements of a machine, a transmitting element, means adapted to selectively connect the driving element with the driven and transmitting elements, and yieldable means operatively connecting the transmitting element with the driven element.

16. A power transmitting mechanism comprising, in combination with the driving and driven elements of a machine, a transmitting element adapted to be rotated by the driving element, and means for reciprocating the driven element slidingly carried by the transmitting element and operatively connected with the driven element.

17. A power transmitting mechanism comprising, in combination with the driving and driven elements of a machine, a transmitting element adapted to be connected with the driving element, and means yieldably connected with the transmitting element and operatively connected with the driven element to shift said element into or out of connection with the driving element.

18. A power transmitting mechanism comprising, in combination with the driving and driven elements of a machine, a transmitting element adapted to be rotated by the driving element and provided with means for reciprocating the driven element, and means adapted to selectively connect the driving element with the transmitting and driven elements.

19. A power transmitting mechanism comprising, in combination with the driving and driven elements of a machine, a transmitting element adapted to be rotated by the driving element, means for selectively connecting the driving element with the driven and transmitting elements, and means connected to rotate with the transmitting element adapted to reciprocate the driven element.

20. A power transmitting mechanism comprising, in combination with the driving and driven elements of a machine, a transmitting element adapted to be rotated by the driving element, and means rotated by the transmitting element adapted to reciprocate the driven element once during a revolution of the driving element.

21. A power transmitting mechanism comprising, in combination with the driving and rotating driven elements of a machine, means for preventing the rotation of the driven element, a transmitting element adapted to be rotated by the driving element when the driven element is prevented from rotating and provided with means normally adapted to reciprocate the driven element, and means connecting the transmitting element with the reciprocating means, said connecting means being adapted to yield to said reciprocating means when the driven element fails to respond to said reciprocating means, said reciprocating means being adapted to yield to the connecting means when the driven element is free to respond to said reciprocating means.

22. A power transmitting mechanism comprising, in combination with the driving and driven elements of a machine, means adapted to selectively connect the driven elements with the driving element, a transmitting element adapted to be connected to rotate with the driving element and operatively connected with the driven elements, and means adapted to automatically disconnect the transmitting and driving elements at the completion of a revolution of the transmitting element.

23. A power transmitting mechanism comprising, in combination with the driving and driven elements of a machine, a transmitting element operatively connected with the driven element, yielding means adapted to connect the transmitting and driving elements, and means adapted to actuate the yielding means to disconnect said elements.

24. A power transmitting mechanism comprising, in combination with the driving and driven elements of a machine, a transmitting element provided with a yielding connecting means, a connecting means carried by the driving element normally adapted to become connected with the yielding means, and means adapted to actuate the connecting means of the driving element to become disconnected from the yielding means.

25. A power transmitting mechanism comprising, in combination with the driving and driven elements of a machine, a transmitting element operatively connected with the driven element, a pair of yielding means adapted to connect the transmitting and driving elements, means adapted to restrain each of said yielding means, and means adapted to actuate said restraining means to release one of the yielding means and restrain the other.

26. A power transmitting mechanism comprising, in combination with the driving and driven elements of a machine, a transmitting element operatively connected with the driven element, a pair of yielding means adapted to connect the transmitting and driving elements, means adapted to restrain the yielding means, and means adapted to actuate the restraining means to cause the simultaneous release of one and restraint of the other yielding means.

27. A power transmitting mechanism comprising, in combination with the driving and driven elements of a machine, a transmitting element operatively connected with the driven element, means adapted to connect the transmitting and driving elements, yielding means adapted to actuate the connecting means to disconnect said elements, and means adapted to restrain said yielding means.

28. A power transmitting mechanism comprising, in combination with the driving and driven elements of a machine, a transmitting element operatively connected with the driven element, a connecting means slidingly mounted on the driving element to rotate therewith, and yielding means normally adapted to urge the connecting means in a position to connect the transmitting and driving elements.

29. A power transmitting mechanism comprising, in combination with the driving and driven elements of a machine, a transmitting element operatively connected with the driven element, a connecting means yieldably supported in position to connect the transmitting element with the driving element, and means adapted to force said connecting means outwardly from said position.

30. A power transmitting mechanism comprising, in combination with the driving and driven elements of a machine, a transmitting element operatively connected with the driven element, yieldable means carried by the driving element normally in position to connect said element with the transmitting element, means adapted to force said yieldable means outwardly from said position, and means to actuate the forcing means.

31. A power transmitting mechanism comprising, in combination with the driving and driven elements of a machine, a transmitting element operatively connected with the driven element, a means connected to rotate with the driving element, yielding means normally adapted to force the connected means in position to establish a connection of the driving element with the transmitting element, means connected to rotate with the transmitting element normally adapted to yield in a direction to connect said transmitting element with the driving element, and means adapted to restrain each of the connecting means.

32. A power transmitting mechanism comprising, in combination with the driving and driven elements of a machine, a transmitting element operatively connected with the driven element, means carried by the transmitting element normally adapted to connect it with the driving element and yieldingly supported by the said transmitting element, yielding means adapted to prevent the yielding of the connecting means, and means adapted to actuate the yielding means to release the connecting means.

33. A power transmitting mechanism comprising, in combination with the driving and driven elements of a machine, a transmitting element operatively connected with the driven element, a pair of connecting means each supported to yield in the direction of the other, yieldable means adapted to restrain the connecting means, and means adapted to restrain the yieldable means whereby one of the connecting means is restrained and the other is released.

34. A power transmitting mechanism comprising, in combination with the driving and driven elements of a machine, a transmitting element operatively connected with the driven element, a pair of yieldable means adapted to connect the transmitting and driving elements, yielding means adapted to restrain the connecting means, and means adapted to either restrain or release the yielding means.

35. A power transmitting mechanism comprising, in combination with the driving and driven elements of a machine, a transmitting element, means carried by said transmitting element adapted to yield in a direction to connect it with the driving element, means adapted to restrain said connecting means, means to cause the restraining means to release the connecting means, said transmitting element being provided with means adapted to prevent the release of its connecting means.

36. A power transmitting mechanism comprising, in combination with the driving and driven elements of a machine, a transmitting element operatively connected with the driven element and adapted for connection with the driving element, a connecting means yieldably carried by the driving element, a connecting means yieldably carried by the transmitting element, means normally adapted to restrain one of the connecting means and to release the other, and means adapted to cause the release and restrain to be interchangeable.

37. In combination with the transmission elements of a machine, a shifting mechanism adapted to establish a selective interchange of said elements, and means connecting said mechanism with said elements adapted to indicate said interchange.

38. A power transmitting mechanism comprising, in combination with the prime mover and driven elements of a machine, a transmitting element normally disconnected from the prime mover and adapted to selectively connect the driven elements with the prime mover, and means adapted to disconnect the prime mover from the driven elements and contemporaneously therewith to connect said prime mover with the transmitting element.

39. A power transmitting mechanism comprising, in combination with the prime mover and driven element of a machine, a transmitting element operatively connected with the driven element and normally disconnected from the prime mover, means adapted to connect said disconnected parts, means adapted to restrain the connecting means from connecting the disconnected parts, and manually operative means adapted to cause the restraining means to release the connecting means.

40. A power transmitting mechanism comprising, in combination with the prime mover of a machine, a driven element, means for connecting said element with the prime mover, a transmitting element connected with the driven element and normally disconnected from the prime mover, and means adapted to disconnect the prime mover from the driven element and contemporaneously therewith to connect said prime mover with the transmitting element.

41. A power transmitting mechanism comprising, in combination with a driven gear, an element connected to shift said gear, an element connected to drive said gear, a foot pedal adapted to disconnect said driving element, and means adapted to be actuated by the said pedal to connect the disconnected driving element with the shifting element.

42. A power transmitting mechanism comprising, in combination with a driven gear, an element connected to shift said gear, means connected to drive said gear, a pedal adapted to disconnect said driving means, and a slide operatively connected with said pedal adapted to establish an operative connection between the driving means and the shifting element.

43. A power transmitting machine comprising, in combination with a driven gear, an element connected to shift said gear, means connected to drive said gear, a coupling connected with said driving means, a pedal adapted to disconnect the driving means from the gear, and means operatively connected with said pedal adapted to establish an operative connection between the shifting element and said coupling during said disconnection.

44. A power transmitting mechanism comprising, in combination with a driven gear, an element connected to shift the gear, a prime mover connected to drive the gear, a sleeve operatively connected with said prime mover, and means adapted to disconnect the prime mover from the gear and contemporaneously therewith to establish an operative connection between the shifting element and the sleeve.

45. A power transmitting mechanism comprising, in combination with a driven gear, an element adapted to shift said gear, an element adapted to drive said gear, a sleeve rotated by said driving element, a collar slidingly carried by said sleeve, and means adapted to operatively connect said collar with the shifting element.

46. A power transmitting element comprising, in combination with a gear shifting element, a rotating sleeve, a connecting means rotatably connected with the sleeve, means adapted to force said connecting means in the direction of the shifting element, and means adapted to establish an operative connection between said shifting element and the connecting means when forced as aforesaid.

47. A power transmitting mechanism comprising, in combination with a gear shifting element, a prime mover a connecting means normally adapted to yield in the direction of the shifting element and operatively connected with the machine, a lever adapted to restrain the connecting means from yielding, and means adapted to disconnect the connecting means from the machine and to prevent the lever from restraining said connecting means.

48. A power transmitting mechanism comprising, in combination with a prime mover, an element connected to be driven thereby, an element adapted to shift the driven element, a serrated disk operatively connected with the prime mover, and means adapted to establish an operative connection between the shifting element and the serrated disk and contemporaneously therewith to disconnect the prime mover from the driven element.

49. A power transmitting mechanism comprising, in combination with the driving and driven elements of a machine, a transmitting element provided with a bearing for the driving element, and means adapted to connect the transmitting element with the driving element to cause said transmitting element to be rotated by the said driving element, a cam mounted to rotate with the transmitting element, and means connected with the driven element adapted to be reciprocated by the cam to shift said driven element into and out of connection with the driving element.

50. A power transmission mechanism comprising, in combination with the driving and driven elements of a machine, a transmitting element operatively connected with the driven element, means normally adapted to connect the driven element with the driving element and contemporaneously therewith disconnect the transmitting element from said driven element, means for connecting the transmitting element with the driving element, and contemporaneously therewith disconnect the driven element from said driving element.

51. A power transmitting mechanism comprising, in combination with the driving and driven elements of a machine, means adapted to operatively connect said elements, a transmitting element adapted to reciprocate the driven element, and a lever adapted to swing in position to cause a disconnection of said driving and driven elements and contemporaneously therewith to establish a connection between said driving element and the transmitting element.

52. A power transmitting mechanism comprising, in combination with the driving and driven elements of a machine, a yieldingly supported bolt normally adapted to establish an operative connection between said elements, said bolt provided with a recess, and means adapted to enter the recess to prevent said bolt from yielding to prevent said connection.

53. A power transmitting mechanism comprising, in combination with the driving and driven elements of a machine, a bolt normally supported to yield in a direction to establish an operative connection between said elements, said bolt being provided with a notch, and a wedge adapted to enter the notch whereby the bolt is forced in an opposite direction.

54. A power transmitting mechanism comprising, in combination with the driving and driven elements of a machine, a bolt operatively connected with the driven element and supported to yield in a direction to connect said elements, a yieldingly fulcrumed lever provided with an arm adapted to force the bolt in an opposite direction and to restrain it from yielding, and means adapted to prevent said arm from releasing the bolt.

55. A power transmitting mechanism comprising, in combination with the driving and driven elements of a machine, means adapted to operatively connect said elements, a yieldingly fulcrumed lever adapted to prevent said connection, a block adapted to restrain the lever from interfering with the connecting means, said block provided with means for releasing the lever.

56. A power transmitting mechanism comprising, in combination with the driving and driven elements of a machine, means operatively connected with the driven element and adapted to become engaged with the driving element, a pair of yieldingly fulcrumed levers, each adapted to cause a disengagement between said means and the driving element, a block adapted to restrain said levers and provided with recesses adapted to release the levers.

57. A power transmitting mechanism comprising, in combination with a driving shaft, a driven element, and a transmitting element adapted to be rotated by the shaft and provided with a cam surface adapted to reciprocate the driven element.

58. A power transmitting mechanism comprising, in combination with a driving shaft, a driven element, and means adapted to be rotated by the shaft and provided with a peripheral cam adapted to reciprocate the driven element.

59. A power transmitting mechanism comprising, in combination with the prime mover of a machine, a transmitter shaft adapted to be operatively connected with the prime mover, a reciprocable element, and means carried by the transmitter shaft operatively connected with the reciprocable element.

60. A power transmitting mechanism comprising, in combination with a driving shaft, a transmitter shaft adapted to be operatively connected with the driving shaft, a collar slidingly mounted thereon and provided with a cam surface, and a driven element operatively connected with the cam surface of said collar.

61. A power transmitting mechanism comprising, in combination with a driving shaft, a transmitter shaft adapted to be connected with the driving shaft, a driven element, means adapted to operatively connect the driven element with the driving shaft and contemporaneously therewith disconnect the transmitter and driving shafts, and means yieldably mounted on said transmitter shaft operatively connected with the driven element.

62. A power transmitting mechanism comprising, in combination with a driving shaft, an axially bored shaft provided with an elongated slot, a rod projected through the bore of said shaft and an oblong nut carried by said rod to project through the slot, a collar carried by said nut mounted to slide on said shaft, means yieldably connecting the projecting end of the rod with its shaft, and a driven element operatively connected with the collar.

63. A power transmitting mechanism comprising, in combination with a driving shaft, a transmitter shaft adapted for connection with said driving shaft, a transmitting element rotated by the transmitter shaft, a driven element normally adapted to be moved by the transmitting element, means adapted to permit the transmitting element to yield to the driven element when said element is prevented from responding to the transmitting element, said means being adapted to prevent the transmitting element from yielding to the driven element when said element is free to respond to the transmitting element.

64. A power transmitting mechanism comprising, in combination with a driving shaft, a driven element provided with a roller, a transmitting element adapted to become operatively connected with the driving element provided with a peripheral bearing for the roller, and a shaft adapted to be rotated by the driving shaft yieldably supporting the transmitting element.

65. A power transmitting mechanism comprising, in combination with the driving and driven elements of a machine, a transmitting element adapted to be operatively connected with the driving element and provided with a peripheral groove whereby it is operatively connected with the driven element and means adapted to operatively connect the driven element with the driving element and contemporaneously therewith disconnect the transmitting element from said driving element.

66. In combination with the transmission elements of a machine, shifters operatively connected with said elements, means adapted to actuate the shifters, yieldable means connecting the shifters with said actuating means and adapted to yield whenever undue strain is required to shift a transmission element, and means adapted to release the yieldable means.

67. In a machine a prime mover, a plurality of transmission elements adapted to be shifted from active into inactive positions and vice versa, means rotatably connected with the prime mover adapted to shift the transmission elements into inactive positions during the first portion of the rotation and to shift them into active positions during the latter portion of the rotation.

68. A power transmitting mechanism comprising, in combination with a driven element, speed changing elements, levers adapted to selectively connect the speed changing elements with the driven element, a driving element normally connected with the driven element, a foot pedal adapted to disconnect the driving element, a transmitting element, means adapted to be operated by said foot pedal to connect the transmitting element with the disconnected driving element, and means operatively connecting said transmitting element with the said levers.

69. A power transmitting mechanism comprising, in combination with the speed gear shifting levers of a machine, a driven element, a driving element connected to operate the driven element, means for disconnecting said driving element, a rotatable element adapted to be connected by the disconnecting means with the disconnected driving element to reciprocate the driven element, and means operatively connecting the shifting levers with the driven element.

70. A power transmitting mechanism comprising, in combination with speed changing gears, levers adapted to shift said gears, an element connected to drive said gears, means adapted to disconnect said element, a rotatable element adapted to be connected with the driving element by the disconnecting means, a driven element operatively connected with the rotatable element, and means adapted to be reciprocated by the driven element operatively connected with the levers.

71. A power transmitting mechanism comprising, in combination with speed changing gears, levers adapted to shift said gears, an element connected to drive said gears, means adapted to disconnect said element, a rotatable element adapted for connection with the disconnected element by the said disconnecting means, a pair of reciprocable elements one of which is operatively connected with the rotatable element and means for reciprocating the other in opposition to the one which is connected with the rotatable element, and means adapted to transmit the motion of said pair of elements to the levers.

72. A power transmitting mechanism comprising, in combination with speed changing gears, levers adapted to shift said gears, an element connected to drive said gears, a pedal to disconnect said element, a rack adapted to be connected by said pedal with the disconnected element to be reciprocated thereby, a pinion in mesh with said connected rack, a rack in mesh with said pinion to reciprocate in opposition with the connected rack, and means adapted to transmit the motion of said racks to the said levers.

73. A power transmitting mechanism comprising, in combination with a speed changing gearing, levers adapted to shift the gears thereof, an element connected to drive said gearing, a pedal adapted to disconnect it from its driving element, and means adapted to be actuated by the said pedal to operatively connect the disconnected element with the levers.

74. A power transmitting mechanism comprising, in combination with a speed changing gearing, levers adapted to shift the gears thereof, an element connected to drive said gearing, a pedal adapted to disconnect it from its driving element, a rotary element adapted for connection with the disconnected driving element, and means operatively connected with the levers adapted to be reciprocated by the rotary element.

75. A power transmitting mechanism comprising, in combination with a speed changing gearing, levers adapted to shift the gears thereof, an element connected to drive said gearing, a pedal adapted to disconnect it from its driving element, a rotary element adapted for connection with the disconnected element by the said pedal, a pair of bars pivotally connected with the levers, and means to reciprocate said bars operatively connected with the rotary element.

76. A power transmitting mechanism comprising, in combination with a speed changing gearing, levers adapted to shift the gears thereof, an element connected to drive said gearing, a pedal adapted to disconnect said gearing from its said element, a pair of bars pivotally connected with said levers each bar provided with a pair of lugs, a transmitting element adapted to be operatively connected by the pedal with the driving element, and means operatively connected with the transmitting element and adapted to become interchangeably engaged with the opposite sides of each lug.

77. A power transmitting mechanism comprising, in combination with a speed changing gearing, levers adapted to shift the gears thereof, an element connected to drive said gearing, a pedal adapted to disconnect said gearing from said element, a pair of bars pivotally connected with said levers, a pair of floating levers to each bar, each floating lever adapted to become interchangeably connected with a corresponding bar with one of its arms or at its fulcrum, a transmitting element adapted to be connected by the pedal with the driving element to operate said floating levers.

78. A power transmitting mechanism comprising, in combination with a speed changing gearing, levers adapted to shift the gears thereof, an element normally connected to drive said gearing and adapted to be disconnected therefrom during the operation of said levers, a pair of bars pivotally connected with said levers, a pair of floating levers to each bar adapted to reciprocate it, means adapted to transmit the motion of the driving element to the floating levers, and means adapted to establish a selective operative connection between the floating levers and the bars.

79. A power transmitting mechanism comprising, in combination with a speed changing gearing, levers adapted to shift the gears thereof, an element connected to drive said gearing and adapted to be disconnected therefrom during the operation of said levers, means for transmitting the motion of the driving element to said levers, and means adapted to establish a selective-operative connection between the transmitting means and said levers.

80. A power transmitting mechanism comprising, in combination with a speed changing gearing, levers adapted to shift the gears thereof, an element connected to drive said gearing, a pedal adapted to disconnect said gearing from its driving element during the operation of said levers, and means adapted to establish a selective operative connection between said levers and the driving element.

81. A power transmitting mechanism comprising, in combination with a speed changing gearing, levers adapted to shift the gears thereof, an element connected to drive said gearing adapted to be disconnected therefrom during the operation of the levers, a transmitting element adapted to become operatively connected with the driving element, and means adapted to establish a selective operative connection between the levers and the transmitting element.

82. A power transmitting mechanism comprising, in combination with a speed changing gearing, levers adapted to shift the gears thereof, an element connected to drive said gearing, a pedal adapted to disconnect said gearing from its driving element, means adapted to select a predetermined change of position of the levers, a transmitting element operatively connected with the levers, means adapted to be actuated by the foot pedal when operated to disconnect the machine to connect the transmitting element with the driving element, said means being normally adapted to prevent said connection.

83. A power transmitting mechanism comprising, in combination with a speed changing element, a prime mover connected with said element, means for disconnecting it from the prime mover, shifting means, means adapted to establish a selective operative connection between the shifting means and the speed changing element, a transmitting element operatively connected with the shifting means, and means adapted to connect the transmitting element with the prime mover when said prime mover is disconnected from the speed changing element.

84. A power transmitting mechanism comprising, in combination with a driven element, a prime mover speed changing elements selectively adapted to connect the prime mover with the driven element, means for disconnecting the prime mover, means adapted to actuate the speed changing elements into a plurality of speed changing positions, a transmitting element operatively connected with the actuating means and adapted to be connected with the prime mover by the disconnecting means, and means adapted to disconnect the prime mover from the transmitting element.

85. A power transmitting mechanism comprising, in combination with a variable speed machine, speed changing elements, a driving element normally adapted to be selectively connected with said speed changing elements, said driving element provided with a shaft and means adapted to disconnect the driving element, means adapted to actuate each of the speed changing elements into a plurality of speed changing positions, a transmitting element operatively connected with the actuating means adapted to be connected by the disconnecting means with the shaft of the disconnected driving element, and means adapted to disconnect the transmitting element from the shaft after each revolution thereof.

86. A power transmitting mechanism comprising, in combination with the speed changing elements of a machine, a driving element adapted to selectively operate the speed changing elements, means adapted to select the speed changing positions of the speed changing elements, a transmitting element operatively connected with the speed changing elements, means adapted to connect the transmitting element with the driving element, said transmitting element being adapted to yield to the speed changing elements whenever they fail to respond to the driving element.

87. A power transmitting mechanism comprising, in combination with a driven element, a driving element, gears selectively adapted to connect said elements, levers adapted to be manually operated to shift said gears, mechanical means adapted to be connected with the driving element to operate said levers selectively, said mechanical means being adapted to yield to said levers when said levers are being operated manually.

88. A power transmitting mechanism comprising, in combination with the gear shifting mechanism of a machine, a driving element, two members movable longitudinally in opposite directions, a driven element, means for selectively connecting the said members with the driven element, means to operatively connect the driven element with the driving element, and means adapted to disconnect the driving from the driven element and contemporaneously therewith to connect said driving element with the longitudinally movable members.

89. In combination with the transmission elements of a machine, means adapted to preselect the transmission elements, shift mechanism adapted to cause the selected interchange of said transmission elements and means adapted to indicate said interchange.

In testimony whereof I have signed this specification in the presence of two subscribing witnesses.

JOHN H. STORTZ.

Witnesses:
NELSON D. WARWICK,
CARRIE E. HAUBERT.